United States Patent Office 3,355,654
Patented Nov. 28, 1967

3,355,654
ELECTRONIC INVERTERS WITH SEPARATE SOURCE FOR PRECHARGING COMMUTATING CAPACITORS
Robert L. Risberg, Milwaukee, Wis., assignor to Cutler-Hammer, Inc., Milwaukee, Wis., a corporation of Delaware
Filed July 13, 1964, Ser. No. 381,969
14 Claims. (Cl. 321—44)

ABSTRACT OF THE DISCLOSURE

A three-phase solid state inverter having semi-conductor controlled rectifiers for switching and inductance-capacitance circuits for commutation of the SCR's including a separate and electrically isolated supply for each phase for precharging the commutating capacitors thereof.

---

Figure 1:
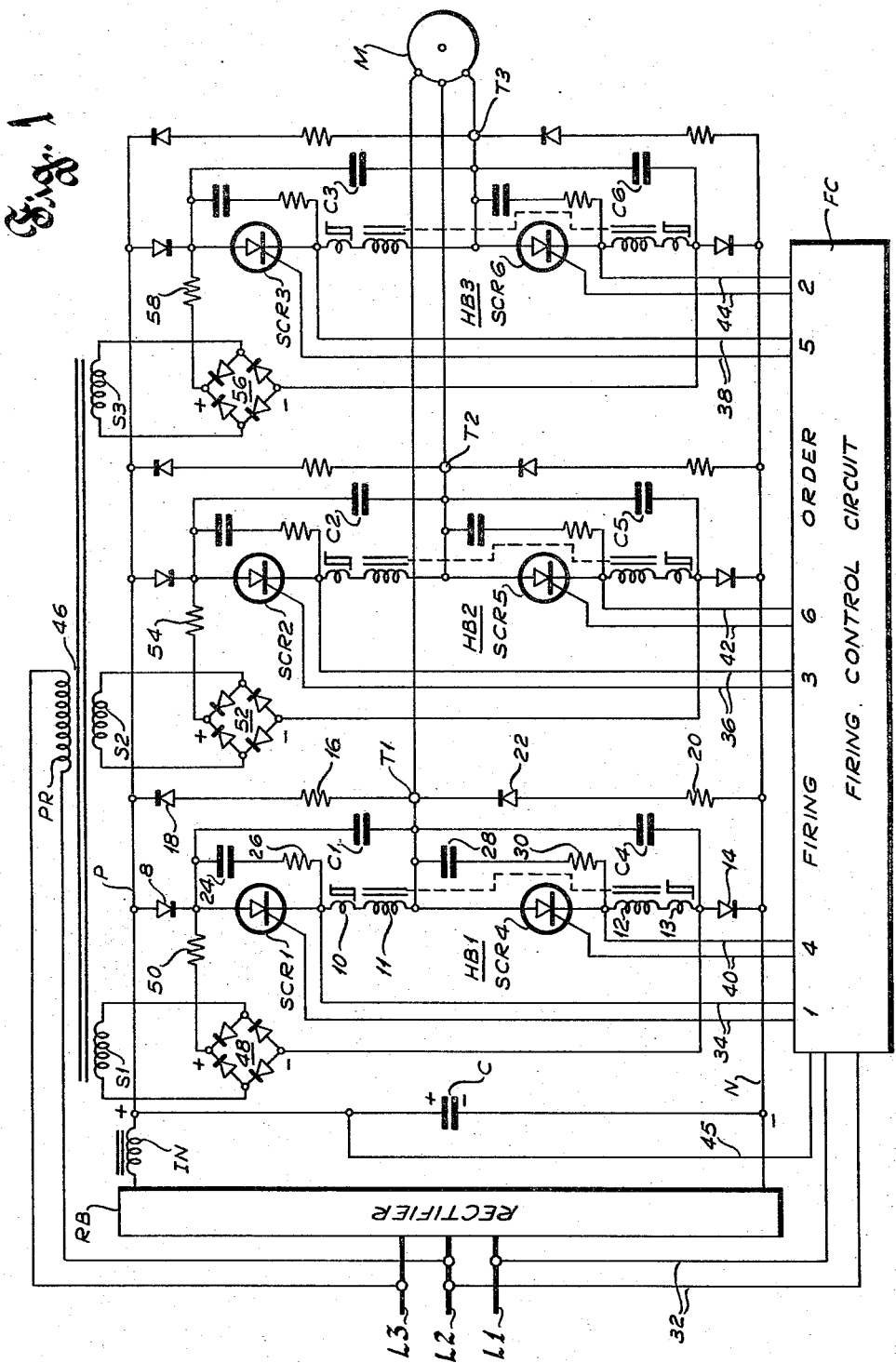

This invention relates to electronic inverters and more particularly to improved commutating means therefor.

While not limited thereto, the invention is especially applicable to solid state inverters of the silicon controlled rectifier (SCR) type or the like for improving the commutation whereby D.C. is converted to A.C.

An object of the invention is to provide improved electronic inverter circuits.

A more specific object of the invention is to provide a bridge type inverter with improved and simplified commutating means.

Another specific object of the invention is to provide a solid state inverter with improved and simplified means for precharging the commutating capacitors.

Another specific object of the invention is to provide improved means for precharging commutating capacitors without wasting energy in a solid state inverter.

Another specific object of the invention is to provide improved means for converting direct current to alternating current wherein the power switching devices are used for switching precharging current to the commutating capacitors.

Another specific object of the invention is to provide a bridge type inverter with means for feeding energy from the commutating inductors back into the direct voltage supply.

Other objects and advantages of the invention will hereinafter appear.

According to the invention there is provided a bridge type electronic inverter preferably of the solid state or semi-conductor type. Silicon controlled rectifiers are used as the power switching devices. While the drawing shows a three-phase inverter, that is, three half-bridges connected in parallel across the direct current source, it will be apparent from the following description that the improvements can also be applied to other types of inverters, such as for example, an inverter having a controllable half-bridge or two controllable half-bridges for single phase output. A commutating capacitor is connected across each silicon controlled rectifier and its associated commutating inductance. To improve the commutation, that is, the turn-off of a conducting silicon controlled rectifier in response to turn-on of a non-conducting silicon controlled rectifier in the same half-bridge, the commutating capacitors are precharged. For this purpose, a separate rectified supply is provided for each half-bridge of the inverter. Each such rectified supply is connected through a charging resistor across the two commutating capacitors in the associated half-bridge. In this manner each silicon controlled rectifier when conducting provides a current path for charging the commutating capacitor connected across the other silicon controlled rectifier in the same half-bridge thereby avoiding the requirement for other switching devices for precharging purposes. Also, no power is drawn from the separate supply except for charging the commutating capacitors thereby avoiding waste of power. Each half-bridge is provided with a pair of blocking diodes, one in each leg thereof, for trapping the charge on the commutating capacitors. Each SCR is provided with an RC circuit for controlling the rate of change of voltage thereon and to absorb recovery transients on commutation. Each SCR is also provided with a ferrite core, square hysteresis loop inductor for controlling the rate of change of current therein. Moreover, each half-bridge is provided with unidirectional feedback circuits rendering the inverter bilateral whereby energy can also flow from the motor in the reverse direction therethrough back into the filter capacitor of the direct voltage supply.

A first modification of the invention is provided with means coupled to the feedback circuits for feeding the inductive energy in the commutating inductance back to the filter capacitor of the direct voltage supply. A second modification has LC filters substituted in place of the precharging control resistors and is provided with means coupled to the feedback circuits for feeding the inductive energy of the commutating inductance back to the filter capacitors in the precharging circuits.

Figure 6:
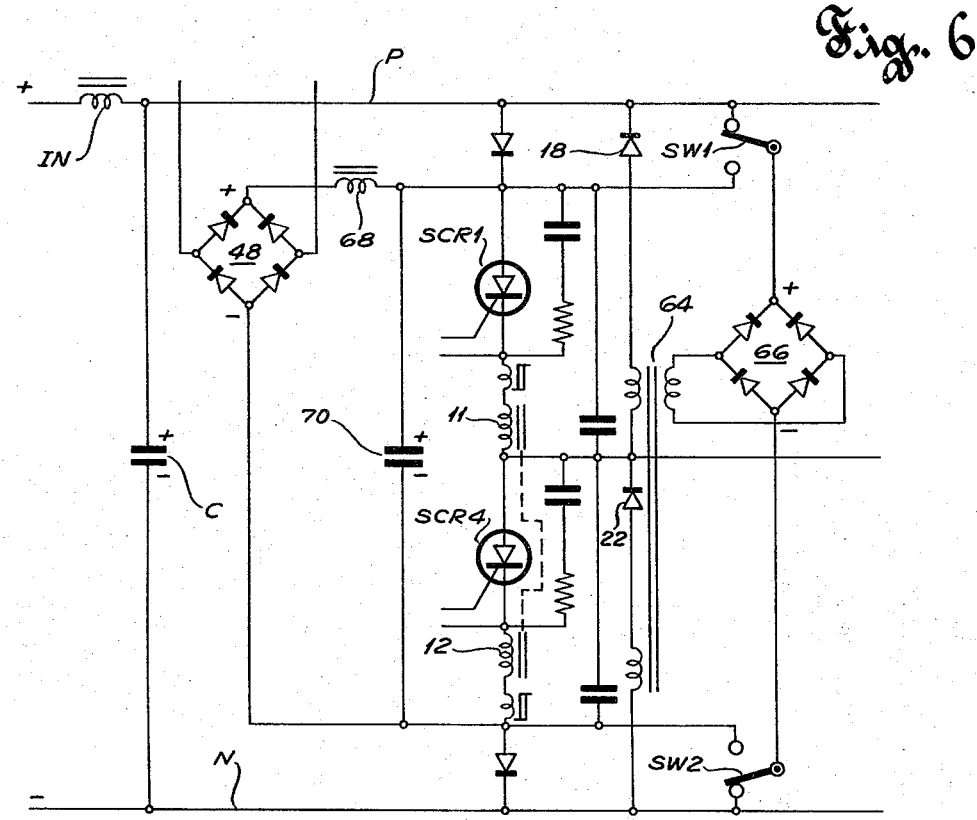

These and other objects and advantages of the invention and the manner of obtaining them will best be understood by reference to the following description of an embodiment of an electronic inverter and modifications thereof taken in conjunction with the accompanying drawings, wherein:

FIGURE 1 is a circuit diagram of an electronic inverter system constructed in accordance with the invention;

FIGS. 2 to 5 graphically depict operating characteristics of the system of FIG. 1; and FIG. 6 is a circuit diagram showing modifications of the system of FIG. 1.

Referring to FIG. 1, there is shown an SCR inverter of the three-phase type. The inverter is supplied with D.C. from a three-phase rectifier bridge RB which is connected through lines L1, L2 and L3 to a three-phase A.C. power supply source. As shown in FIG. 1, the positive and negative output terminals of rectifier bridge RB are connected through a smoothing filter to conductors P and N, respectively, for supplying direct current to the inverter. The smoothing filter comprises an inductor IN connected between the positive terminal of bridge RB and conductor P and a capacitor C connected across positive and negative conductors P and N. The three output terminals T1, T2 and T3 of the inverter are connected to a load device such as a three-phase alternating current motor M.

As will be apparent, use of an inverter provides a convenient way of adjusting the speed of an A.C. squirrel cage motor by adjusting the magnitude and frequency of the inverter output. This can be done by using the adjustable D.C. supplied to the inverter also for controlling the frequency of the inverter firing control circuit.

As shown in FIG. 1, the inverter comprises three half-bridges HB1, HB2 and HB3 connected in parallel across a direct current source to form a three-phase inverter of the bridge type. Half-bridge HB1 is provided with silicon controlled rectifiers SCR1 and SCR4, half-bridge HB2 is provided with silicon controlled rectifiers SCR2 and SCR5, and half-bridge HB3 is provided with silicon controlled rectifiers SCR3 and SCR6. Since the three half-bridges are alike, only the first half-bridge HB1 will be described in detail.

Half-bridge HB1 is provided at its upper portion with a unidirectional diode 8 for conducting one half cycle of load current from conductor P therethrough and through silicon controlled rectifier SCR1 and inductors 10 and 11 to output terminal T1. A path for the other half cycle of load current flow extends from output terminal T1 through silicon controlled rectifier SCR4, inductors 12 and 13 and a unidirectional diode 14 in the lower portion of half-bridge HB1 to conductor N.

The upper portion of half-bridge HB1 is provided with a commutating capacitor C1 connected across silicon controlled rectifier SCR1 and inductors 10 and 11. The upper portions of half bridges HB2 and HB3 are provided with similar commutating capacitors C2 and C3 and the lower portions of the three half-bridges are provided with similar commutating capacitors C4, C5 and C6, respectively, connected in like manner across the silicon controlled rectifiers and respectively associated inductors.

Diodes 8 and 14 are blocking diodes for trapping charge on the commutating capacitors. As will be apparent, these diodes prevent the commutating capacitors from discharging into the direct voltage supply conductors P and N.

Inductors 10 and 13 are ferrite core inductors for $di/dt$ protection of the associated silicon controlled rectifiers. These inductors are saturating reactors provided with individual cores of square hysteresis loop material and provide their protective functions when the associated SCR's are fired. Without these reactors, the current would jump to the value flowing in the other leg of the half-bridge and its rate of change would be limited only by the leakage reactance in the commutating inductance coil. The ferrite inductor allows only a small current to flow, equal to the coercive ampere turns, until the core saturates thus allowing the SCR to turn fully on before the current increases to the load current level. The ferrite core is reset by a displacement current that flows backwards through the SCR being turned off.

Inductors 11 and 12 are commutating inductors. The two commutating inductors of the same half-bridge are provided with close magnetic coupling by having their windings wound on the same core as depicted by the broken line in FIG. 1. This close coupling can be obtained by a bifilar winding.

To render the inverter bilateral, that is, to provide a path for current flow also in the reverse direction therethrough from the motor to filter capacitor C and to provide a circuit for current flow in response to the induced voltage of the commutating inductor, each portion of the half-bridge is provided with a unidirectional current conducting circuit or feedback circuit. For this purpose, a small resistor 16 and a unidirectional diode 18 are connected in series from output terminal T1 to positive conductor P to allow current flow from inductor 11 through resistor 16, diodes 18 and 8, silicon controlled rectifier SCR1 and ferrite inductor 10. A resistor 20 and a unidirectional diode 22 are connected in series from negative conductor N to output terminal T1 to allow current flow from inductor 12 through ferrite inductor 13, diode 14, resistor 20, diode 22 and silicon controlled rectifier SCR4. Since the other two half-bridges are each provided with similar unidirectional circuits connected reversely across the respective legs thereof, it will be apparent that inductive current of the load can flow from negative conductor N through resistor 20 and diode 22 to terminal T1 when SCR4 is turned off and can flow from terminal T1 through resistor 16, diode 18 and positive conductor P to capacitor C when SCR1 is turned off, each of these currents also flowing through the unidirectional circuit in shunt of a turned off SCR in another half-bridge.

A small capacitor 24 and a small resistor 26 are connected in series across silicon controlled rectifier SCR1 at the anode and cathode thereof. A similar capacitor 28 and resistor 30 are connected in series across silicon controlled rectifier SCR4. Similar resistor-capacitor circuits are also connected across the silicon controlled rectifiers in the other half-bridges. These circuits function to slow down the rate of change of voltage across the silicon controlled rectifiers and to absorb recovery transients.

As shown schematically in FIG. 1, the inverter system is provided with a firing control circuit FC for rendering silicon controlled rectifiers SCR1 through SCR6 conducting in a predetermined order. The firing control circuit is energized from supply lines L1 and L2 through a pair of conductors 32 and is provided with six outputs connected through pairs of conductors 34, 36, 38, 40, 42 and 44 across the gates and cathodes of silicon controlled rectifiers SCR1 through SCR6, respectively. The firing control circuit applies firing voltages through these pairs of output conductors to render the silicon controlled rectifiers conducting in a predetermined repetitively sequential order. The numerals along the upper portion of firing control circuit FC indicate the order in which the firing pulses are applied to the inverter circuit. The firing control circuit provides three outputs at all times as hereinafter described in more detail in connection with description of operation of the system. These three outputs maintain three silicon controlled rectifiers conducting at all times and this conduction of three is shifted or advanced among the six. When a fourth output pulse fires a fourth silicon controlled rectifier, the first output pulse is terminated and the first silicon controlled rectifier is reverse-biased and rendered nonconducting. The firing control circuit is provided with a control signal from the positive side of capacitor C through conductor 45 to control the frequency of the firing voltages. As will be apparent, this control signal is proportional to the direct voltage input to the inverter. In this manner, the inverter provides a three-phase output voltage of adjustable magnitude and frequency as hereinafter more fully described. For a detailed illustration and description of a firing control circuit usable with this inverter system, reference may be had to R. L. Risberg copending application Ser. No. 381,970, filed July 13, 1964, and assigned to the assignee of this invention.

The inverter system shown in FIG. 1 is provided with means for precharging the commutating capacitors of each phase from a separate and electrically isolated source. This means comprises a transformer 46 having its primary winding PR connected to supply lines L2 and L3 and being provided with three secondary windings for supplying precharging currents to the three half-bridges, respectively, of the inverter circuit, these currents being electrically isolated from one another by these secondary windings. Secondary winding S1 is connected to the input terminals of a rectifier bridge 48. The positive output terminal of bridge 48 is connected through a precharging control resistor 50 to the upper side of capacitor C1 and the negative output terminal of the bridge is connected to the lower side of capacitor C4 whereby the output of the bridge is connected across capacitors C1 and C4 in series. In a similar manner, transformer secondary winding S2 is connected through a rectifier bridge 52 and a precharging control resistor 54 across commutating capacitors C2 and C5 in series in the second half-bridge HB2. And in like manner, transformer secondary winding S3 is connected through a rectifier bridge 56 and a precharging control resistor 58 across commutating capacitors C3 and C6 in series in the third half-bridge of the inverter circuit.

Figure 2:
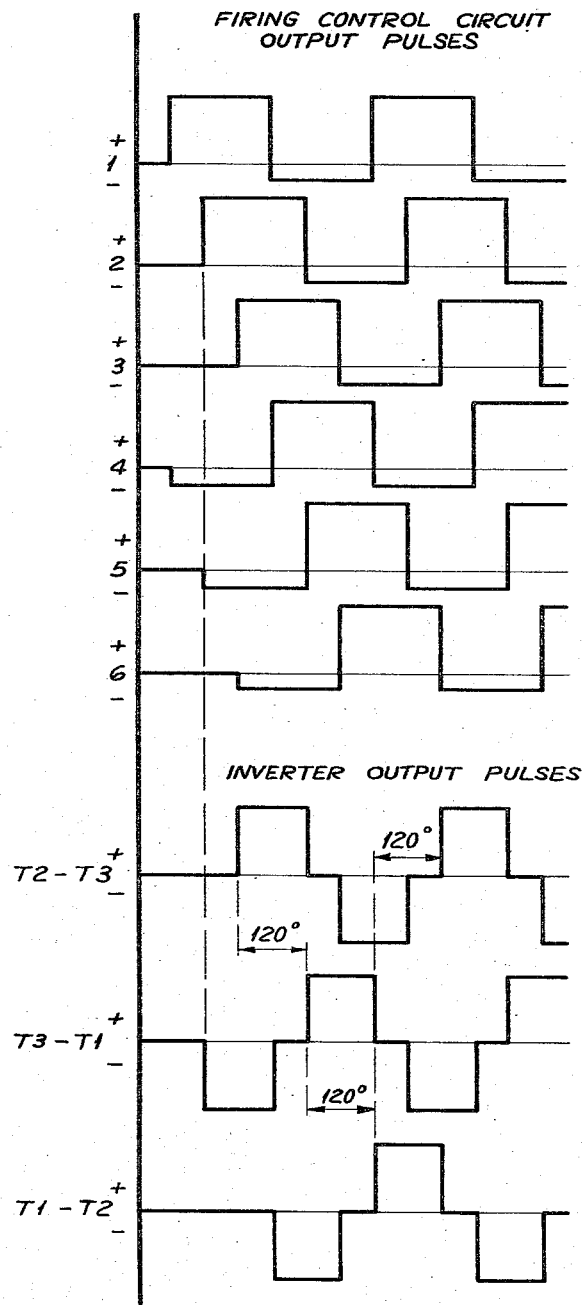
Figure 3:
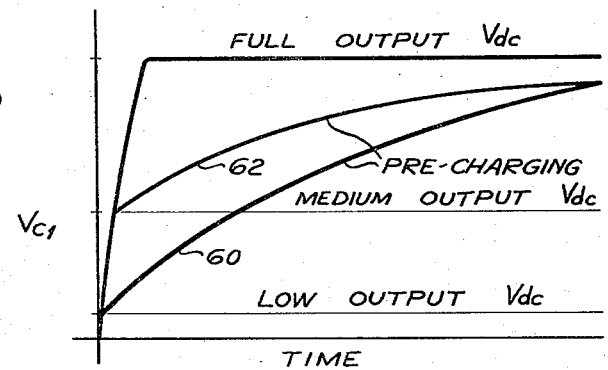

The upper portion of FIG. 2 shows the output pulses of firing control circuit FC and the lower portion thereof shows the inverter output power pulses applied to motor M. FIG. 3 shows precharging curves for the commutating capacitors.

The operation of the system of FIG. 1 will now be described with reference to FIGS. 2 and 3. Let it be assumed that three-phase alternating current power is applied to lines L1, L2 and L3. This power is rectified in rectifier bridge RB and smoothed by inductor IN and capacitor C to apply unidirectional voltage across positive and negative conductors P and N when the system is turned on. Single-phase alternating current power is applied from lines L1 and L2 to firing control circuit FC to supply the latter with operating voltage. Single-phase alternating voltage is also applied from lines L2 and L3 through transformer 46 to rectifier bridges 48, 52 and 56.

Before any of the silicon controlled rectifiers are fired, current flows from the positive output terminal of rectifier bridge 48 through resistor 50 to commutating capacitors C1 and C4. Since these commutating capacitors C1 and C4 are charged in series, each such capacitor charges to one-half the voltage applied thereacross.

In a similar manner, commutating capacitors C2 and C5 in half-bridge HB2 and commutating capacitors C3 and C6 in half-bridge HB3 are charged by current flow from the precharging circuits, each such capacitor being charged to one-half the voltage appearing across each pair thereof.

When rectifier bridge RB and firing control circuit FC are started operating, adjustable unidirectional voltage is applied to conductors P and N and the positive firing pulse 1 shown in FIG. 2 is applied through conductor pair 34 to render silicon controlled rectifier SCR1 conducting. As a result, current flows from conductor P through diode 8 and SCR1 and inductors 10 and 11 to charge capacitor C4 quickly to the value of the supply voltage or Vdc as shown in FIG. 3. The value of this voltage is dependent on the magnitude of the output voltage of the rectifier bridge RB or the voltage on filter capacitor C, FIG. 3 illustrating low, medium and full outputs.

The firing of SCR1 also causes the precharging circuit to become effective to provide additional charge on capacitor CR as illustrated in FIG. 3. To this end, current flows from rectifier bridge 48 through resistor 50, SCR1 and inductors 10 and 11 to charge capacitor C4 to a higher voltage.

For exemplary purposes, let it be assumed that full output voltage from rectifier bridge RB is 600 volts and that the precharging circuit supplies a slightly smaller voltage of about 590 volts for charging the commutating capacitors. Under these conditions, it will be apparent from FIG. 3 that the precharging circuit is most useful at less than full output from rectifier bridge RB and has little effect at full output voltage. As shown in FIG. 3, at low output from rectifier bridge RB, the precharging circuit charges capacitor C4 as shown by curve 60. At medium output, the precharging circuit charges capacitor C4 according to curve 62 in FIG. 3.

Continuing with the description of operation of the system, firing pulse 2 is applied through conductor pair 44 to render SCR6 conducting thereby to complete a circuit to motor M to initiate energization thereof. This causes current flow from conductor P through the upper portion or positive leg of half-bridge HB1 including SCR1 to motor terminal T1, through the motor winding and then from motor terminal T3 through the lower portion or negative leg of half-bridge HB3 including SCR6 to conductor N. This current flow to the motor is illustrated in FIG. 2 as the T3–T1 inverter negative output volatge.

Conduction of SCR6 causes commutating capacitor C3 to be charged to a higher voltage. To this end, current flows from conductor P through the blocking diode and capacitor C3 and the negative leg of half-bridge HB3 including SCR6 quickly to charge capacitor C3 to the output voltage of rectifier bridge RB. In addition, current flows from bridge 56 through resistor 58 and the lower portion of half-bridge HB3 including SCR6 to charge capacitor C3 to the voltage of the precharging circuit.

The third firing pulse is applied through conductor pair 36 to render SCR2 conducting. This causes current flow into terminal T2 of the motor and out of terminal T3. This current flow is shown as the left-hand positive pulse T2–T3 in FIG. 2. Firing of SCR2 causes commutating capacitor C5 to be precharged in the same manner as hereinbefore described. This commutation consists of causing SCR1 to turn off in response to firing of SCR4. As shown at the upper portion of FIG. 2, when positive pulse 4 is applied to SCR4, positive pulse 1 terminates and a small negative voltage is applied to the gate-cathode circuit of SCR1. However, as is well known, an SCR continues to conduct as long as positive anode voltage is applied even if the gate voltage terminates or is reversed in polarity. To turn off a silicon controlled rectifier, either the positive anode voltage must be reduced to zero or sufficient positive voltage must be applied to the cathode to reverse bias the anode-cathode circuit. In FIG. 1 since constant voltage is applied to the anode of SCR1, the latter course is taken, that is, positive voltage is applied to the cathode to turn SCR1 off. To this end, when SCR4 is fired as aforesaid, precharged capacitor C4 discharges through SCR4, inductors 12 and 13 and diode 14. This discharge current flow through commutating inductor 12 induces a high positive voltage in inductor 11 which is applied to the cathode of SCR 1 to turn it off.

The condition of the inverter following firing of SCR4 is illustrated at the lower portion of FIG. 2. The T3 to T1, T2 to T3 and T1 to T2 directions of current flow are illustrated as positive pulses whereas the negative pulses indicate the opposite or T1 to T3, T3 to T2 and T2 to T1 directions of current flow, respectively. When SCR4 is fired, current flows through the upper portion of half-bridge HB2 and the lower portion of half-bridge HB1 to produce the T2 to T1 negative pulse shown in FIG. 2. At the time that this negative pulse starts, the negative T1–T3 pulse terminates according to FIG. 2.

The fifth firing pulse then renders SCR3 conducting whereby SCR6 is turned off in the same manner hereinbefore described. This produces the T3 to T1 positive pulse and terminates the T2 to T3 positive pulse as shown in FIG. 2. The sixth pulse similarly fires SCR5 and turns SCR2 off. This initiates the T3 to T2 negative pulse and terminates the T2 to T1 negative pulse as shown at the lower portion of FIG. 2.

The firing pulses are then repeated in the same order. It will be apparent from FIG. 2 that three silicon controlled rectifiers conduct at all times and when a fourth one is fired the first of the conducting ones is turned off. As each silicon controlled rectifier is fired, the other silicon controlled rectifier in the same half-bridge is turned off. This produces the three-phase output voltage shown at the lower portion of FIG. 2. Each phase of this output voltage consists of a square wave having a 60 degree dwell on either side of a 120 degree pulse. As is also shown in the lower portion of FIG. 2, the positive pulses of the three phases are displaced 120 degrees apart.

Figure 4:
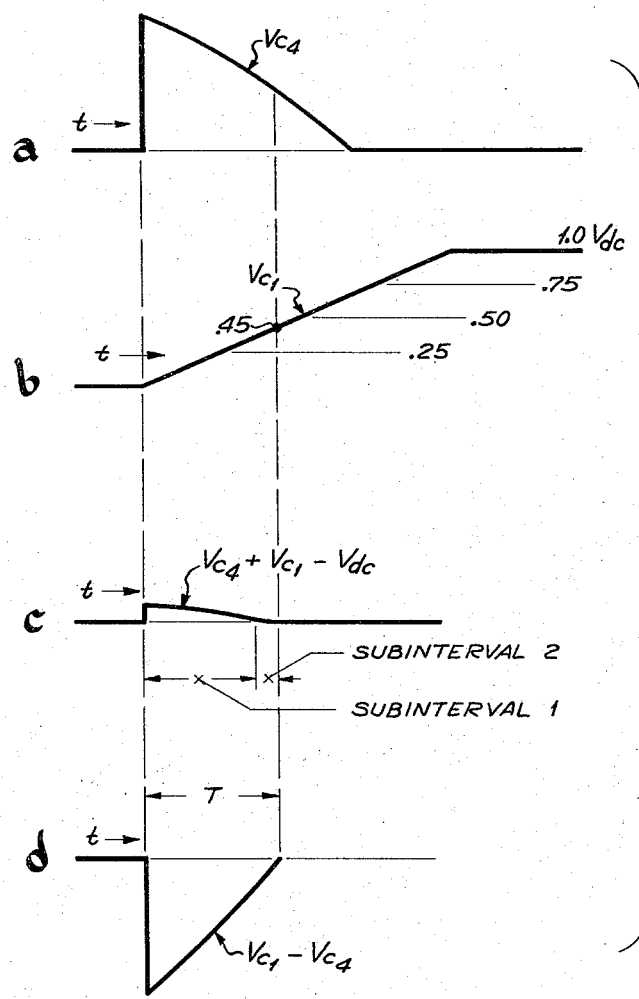
Figure 5:
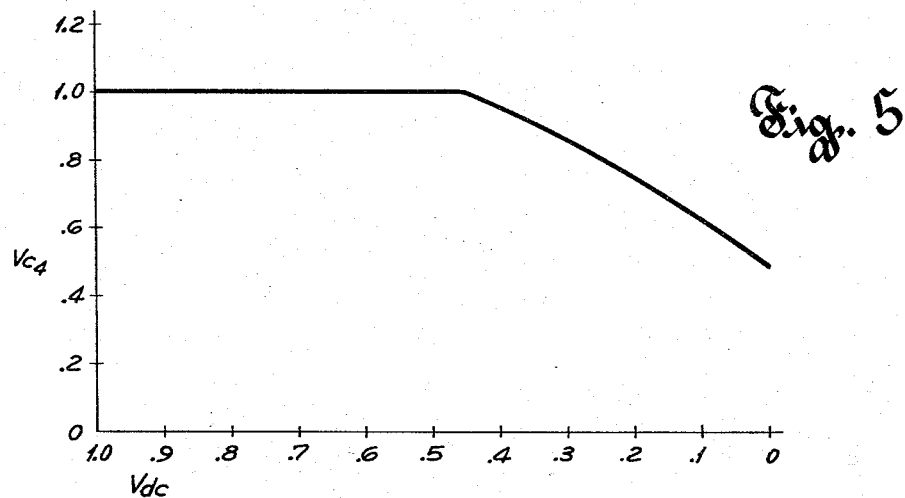

The curves in FIG. 4 illustrate the commutating interval. When SCR4 is fired, SCR1 is turned off. SCR1 will be reverse biased for turn-off as long as the voltage across capacitor C4 is greater than the voltage across capacitor C1.

When SCR4 is fired, the current therethrough is initially equal to the load current which had been flowing in inductor 11. The current through SCR4 then increases with the sinusoidal component of capacitor C4 discharging through inductor 12. At the instant SCR4 is fired, the constant load current is shunted through capacitor C1 quickly charging it linearly to the Vdc output level, that is, the value of voltage appearing across conductors P and N. This charging of capacitor C1 is shown in FIG. 4(b). After the Vdc level is reached capacitor C1 continues to charge to the precharge level as shown in FIG. 3.

The turn-off or commutating interval can be divided into two subintervals. The first subinterval begins when SCR4 is fired and lasts until the sum of the voltages on capacitors C1 and C4 equal Vdc. The second subinterval of turn-off time begins at the end of the previous interval and lasts until the voltages on capacitors C1 and C4 are equal and each is equal to one-half of Vdc. During the first subinterval, capacitor C1 is charged with constant current as shown in FIG. 4(b) and capacitor C4 is discharged to decrease its voltage as shown in FIG. 4(a). During this subinterval, diode 14 is open circuit since capacitor C4 discharges through SCR4 and inductors 12 and 13. The curve in FIG. 4(c) indicates the length of time that diode 14 is an open switch. At the end of the first subinterval, the sum of the voltages on capacitors C1 and C4 equals Vdc and diode 14 becomes a short circuit or closed switch.

The second subinterval begins at this time and ends when the voltage on capacitor C1 equals the voltage on capacitor C4 and equals one-half the supply voltage Vdc at time T as shown by the curve in FIG. 4(d). The curve in FIG. 4(d) also indicates the voltage across SCR1. When this voltage is no longer negative, the turn-off period is over.

It will be apparent from the curves in FIGS. 4(a) and (b) that precharging of the commutating capacitors is required in order to maintain the turn-off time constant for different values of adjustable supply voltage Vdc. As indicated therein, with capacitor C4 charged to 1.0 Vdc, the turn-off time will be the same for any Vdc output level between 1.0 Vdc and .45 Vdc. If the Vdc output level is less than .45 Vdc, say .25 Vdc, then the turn-off time will be extended until capacitor C4 discharges to a level of .25 Vdc. In other words, a longer time will be required for commutation. Therefore, to maintain the same turn-off time for all levels of Vdc and with the load current remaining constant, capacitor C4 requires a precharge of 1.0 Vdc in the range of 1.0 to .45 Vdc output level and then a decreasing precharge in the range of .45 to 0 Vdc as shown in the curve in FIG. 5.

The precharging circuits hereinbefore described provide the necessary precharging of the commutating capacitors to maintain the commutating interval at the optimum value. With this arrangement, the silicon controlled rectifiers switch the precharging circuit from one capacitor to another. For example, when SCR4 is fired and SCR1 turns off, this action switches the precharging circuit from capacitor C4 to capacitor C1. Current then flows from bridge 48 through resistor 50, SCR4 and inductors 12 and 13 to precharge capacitor C1.

Referring to FIG. 6, there are shown two possible modifications of the system of FIG. 1. Only one half-bridge of the inverter has been shown in FIG. 6 since the other two half-bridges will be similar and connected in parallel therewith across the D.C. supply lines at the filter output.

Both modifications provide for feeding inductive energy back into the system. The first modification consists of substituting a transformer 64 for resistors 16 and 20 of FIG. 1 and adding a rectifier bridge 66. Transformer 64 has two primary windings, one in place of each resistor 16 and 20, and a single secondary winding connected through rectifier bridge 66 to supply lines P and N. The positive output terminal of bridge 66 is connected to conductor P and the negative output terminal thereof is connected to conductor N. As will be apparent, currents flowing through feedback diodes 18 and 22 will feed energy through the transformer and rectifier bridge back to filter capacitor C, thereby recouping the commutating energy.

The second modification consists of substituting a smoothing filter comprising an inductor 68 and a capacitor 70 in place of precharging resistor 50 of FIG. 1. When switches SW1 and SW2 are actuated to their other positions, the inductive energy will be fed back through transformer 64 and bridge 66 to capacitor 70 in the precharging circuit to save power. While switches SW1 and SW2 have been shown to facilitate illustration, it will be apparent that either modification can be permanently connected and these switches omitted.

While the amount of power saved by these modifications at an inverter output frequency of 60 cycles per second might be insignificant, these modifications will find greater utility and will save more power at higher frequencies.

While the apparatus hereinbefore described is effectively adapted to fulfill the objects stated, it is to be understood that I do not intend to confine my invention to the particular preferred embodiments of electronic inverters disclosed, inasmuch as they are susceptible of various modifications without departing from the scope of the appended claims.

I claim:

1. In a parallel inverter of the bridge type having at least one controllable half-bridge including first and second portions connectable at their junction to an inductive load device, the combination comprising:

a controllable electronic switching device in each said portion;

control means for rendering said switching devices alternately conducting and being operative when one of said switching devices is rendered conducting for rendering the other switching device non-conducting;

said control means comprising a commutating inductor connected in series with each said switching device;

said control means also comprising a pair of commutating capacitors connected in series with one another and connected individually across the switching device and commutating inductance in each said portion of the half-bridge;

an adjustable direct voltage source for supplying operating voltage to said inverter;

a separate precharging direct voltage source connected across said commutating capacitors;

and a pair of blocking diodes connecting said adjustable direct voltage source across said half-bridge and blocking discharge of said commutating capacitors into said adjustable source.

2. The invention defined in claim 1, together with:

means rendering said inverter bilateral whereby current can also flow in the reverse direction therethrough in response to the counter voltage of the inductance load device and comprising:

a unidirectional circuit connected from the negative side of said adjustable source to said junction and another unidirectional circuit connected from said junction to the positive side of said adjustable source.

3. The invention defined in claim 2, wherein each said unidirectional circuit comprises:

a resistor and a unidirectional diode connected in series.

4. The invention defined in claim 2, wherein each said unidirectional circuit comprises:

a unidirectional diode circuit for conducting current in response to the counter voltage of said inductive load device and in response to the induced voltage of said commutating inductor;

and means for feeding electrical energy from said diode circuit back into one of said direct voltage sources.

5. The invention defined in claim 1, wherein:

each said switching device comprises a silicon controlled rectifier.

6. The invention defined in claim 5, together with:

means for controlling the rate of change of voltage on each said silicon controlled rectifier and for absorbing recovery transients comprising:

an RC circuit connected across each said silicon controlled rectifier.

7. The invention defined in claim 5, together with:

means for controlling the rate of change of current in each said silicon controlled rectifier comprising:

a substantially square hysteresis loop inductor device connected in series with each said silicon controlled rectifier.

8. An electronic inverter circuit comprising:
a plurality of half-bridges connected in parallel with one another across a direct voltage source;
each said half-bridge comprising upper and lower portions adapted to be connected at their junction to an output terminal of an inductive load;
each said upper and lower portion comprising a diode and a solid state controlled rectifier and a commutating inductor in series connection with the diodes being connected to the opposite sides of said source;
a commutating capacitor connected across the controlled rectifier and inductor in each such upper and lower portion so that the two commutating capacitors in each half-bridge are connected in series with one another and with said diodes across said direct voltage source;
and means for precharging the two commutating capacitors in each half-bridge independently of said direct voltage source and for utilizing the two controlled rectifiers for alternately switching the precharging current to the two commutating capacitors whereby when the controlled rectifier in one portion of the half-bridge is fired it conducts current to the commutating capacitor connected in the other portion of the same half-bridge and said diodes block discharge of said capacitors into said source.

9. The invention defined in claim 8, wherein said precharging means comprises a separate and electrically isolated direct voltage source connected across the two commutating capacitors;
and feedback means responsive to the induced voltage of each said inductor for feeding current back to one of said direct voltage sources.

10. The invention defined in claim 8, together with:
a unidirectional feedback circuit connected across each said upper and lower portion of said half-bridge for conducting current in response to the induced voltage of the associated inductor and the inductive current of the load;
a smoothing capacitor connected across the output of said direct voltage source;
and means coupled to said feedback circuit for feeding current back to said smoothing capacitor.

11. The invention defined in claim 8, together with:
a unidirectional feedback circuit connected across each said upper and lower portion of said half-bridge for conducting current in response to the induced voltage of the associated inductor;
a smoothing capacitor connected across the output of said precharging means;
and means coupled to said feedback circuit for feeding current back to said smoothing capacitor.

12. In a bridge type inverter comprising at least one half-bridge having two legs connected at their junction to an output terminal and the two legs being connected in series across a direct voltage source, each said leg comprising a diode, a controlled rectifier and an inductor;
means connecting the diode and the controlled rectifier and the inductor in that order from the positive side of the source to the output terminal;
means connecting the controlled rectifier and the inductor and the diode in that order from the output terminal to the negative side of the source;
a commutating capacitor connection across the controlled rectifier and associated inductor in each said leg;
a unidirectional feedback circuit connected reversely across each said leg for conducting current in response to the voltage induced in the associated inductor during commutation;
and (a) an independent direct voltage precharging source connected across the two commutating capacitors of the half-bridge in series whereby each controlled rectifier when conducting conducts current to the commutating capacitor in the other leg of the same half-bridge.

13. The invention defined in claim 12, wherein said direct voltage source for the inverter comprises:
rectifier means connected to an alternating current source for supplying direct voltage to said inverter;
and said precharging source comprising rectifier means connected through a transformer to said alternating current source whereby the precharging voltage is independent of the inverter supply voltage.

14. A three-phase solid state inverter comprising:
an adjustable direct voltage supply;
three half-bridges connected in parallel with one another across said supply;
each said half-bridge comprising two legs connected in series across said supply and connected at their junction to an output terminal;
each said leg comprising a diode and a solid state controlled rectifier and an inductor connected in series, the diode in one leg connected to the positive side of said supply and the diode of the other leg connected to the negative side of the supply;
a unidirectional feedback circuit connected reversely across each leg;
a commutating capacitor connected across the controlled rectifier and associated inductor in each leg;
and a separate and electrically isolated direct voltage source precharging circuit for each half-bridge connected across the two commutating capacitors in series and being independent of said adjustable direct voltage supply.

References Cited
UNITED STATES PATENTS

| | | | |
|---|---|---|---|
| 3,131,343 | 4/1964 | Reinert | 321—16 |
| 3,176,211 | 3/1965 | Linn | 321—45 X |
| 3,263,152 | 7/1966 | Walker | 321—45 |
| 3,286,155 | 11/1966 | Corey | 321—45 |
| 3,303,406 | 2/1967 | Bedford | 321—45 X |

JOHN F. COUCH, *Primary Examiner.*

W. SHOOP, *Assistant Examiner.*